United States Patent
Jendrossek et al.

(10) Patent No.: US 9,038,318 B2
(45) Date of Patent: May 26, 2015

(54) DUAL END CAP FOR A SEAL ASSEMBLY

(71) Applicants: Norbert Jendrossek, Willich (DE); Dirk Cholewa, Mönchengladbach (DE)

(72) Inventors: Norbert Jendrossek, Willich (DE); Dirk Cholewa, Mönchengladbach (DE)

(73) Assignee: HENNIGES AUTOMOTIVE SEALING SYSTEMS NORTH AMERICA, INC., Dover, DE (US)

( * ) Notice: Subject to any disclaimer, the term of this patent is extended or adjusted under 35 U.S.C. 154(b) by 0 days.

(21) Appl. No.: 13/956,715

(22) Filed: Aug. 1, 2013

(65) Prior Publication Data

US 2014/0035314 A1  Feb. 6, 2014

Related U.S. Application Data

(60) Provisional application No. 61/678,438, filed on Aug. 1, 2012.

(51) Int. Cl.
*E06B 7/16* (2006.01)
*B60J 10/04* (2006.01)
*B60J 10/00* (2006.01)

(52) U.S. Cl.
CPC .............. *B60J 10/041* (2013.01); *B60J 10/04* (2013.01); *B60J 10/042* (2013.01); *B60J 10/0022* (2013.01); *B60J 10/0028* (2013.01);
(Continued)

(58) Field of Classification Search
CPC ...... B60J 10/041; B60J 10/042; B60J 10/044; B60J 10/04
USPC ............ 49/475.1, 493.1, 492.1, 479.1, 489.1, 49/496.1, 490.1, 440, 441, 377, 374, 495.1
See application file for complete search history.

(56) References Cited

U.S. PATENT DOCUMENTS 3,290,082 A * 12/1966 Fritsch .......................... 293/128
3,742,649 A *  7/1973 Dochnahl ...................... 49/441
4,066,285 A     1/1978 Hall et al.
(Continued)

FOREIGN PATENT DOCUMENTS

CN      1465494 A    1/2004
CN    200985001 Y   12/2007
(Continued)

OTHER PUBLICATIONS

English language abstract and machine-assisted English translation for KR706421 extracted from the Thomson Innovation database on Aug. 25, 2014, 9 pages.
(Continued)

*Primary Examiner* — Katherine Mitchell
*Assistant Examiner* — Marcus Menezes
(74) *Attorney, Agent, or Firm* — Howard & Howard Attorneys PLLC

(57) ABSTRACT

A seal assembly for a vehicle having a first seal and a second seal with a dual end cap disposed between the first and second seals. The dual end cap has a cover that extends beyond the first and second seal, for providing an aesthetic transition between the first and second seals. The dual end cap also has a first projection extending from the dual end cap for coupling the dual end cap to the first seal. The dual end cap also has a hold down feature extending opposite the first projection. The hold down feature engages at least a portion of the third distal end of the second seal such that the portion of the third distal end is sandwiched between the cover and the hold down feature for securing the dual end cap to the second seal.

17 Claims, 5 Drawing Sheets

(52) U.S. Cl.
CPC ............ *B60J10/0062* (2013.01); *B60J 10/008* (2013.01); *B60J 10/0091* (2013.01)

(56) References Cited

U.S. PATENT DOCUMENTS

| | | | |
|---|---|---|---|
| 4,592,127 | A | 6/1986 | Simon |
| 4,719,067 | A | 1/1988 | Thiel |
| 4,911,349 | A | 3/1990 | Miller |
| 4,948,637 | A | 8/1990 | Kessler |
| 5,054,240 | A * | 10/1991 | Nakahara et al. ............ 49/479.1 |
| 5,186,509 | A | 2/1993 | Tyves |
| 5,275,455 | A | 1/1994 | Harney et al. |
| 5,297,360 | A * | 3/1994 | Besore et al. ................ 49/484.1 |
| 5,353,549 | A * | 10/1994 | Henderson et al. .......... 49/490.1 |
| 5,557,890 | A * | 9/1996 | Levy et al. ...................... 49/502 |
| 6,748,702 | B2 | 6/2004 | Jang ............................. 49/475.1 |
| 7,055,291 | B2 | 6/2006 | Nakanishi et al. |
| 7,210,730 | B2 | 5/2007 | Fujita et al. |
| 7,390,050 | B2 * | 6/2008 | Nakao et al. ................ 296/146.1 |
| 7,407,205 | B2 | 8/2008 | Nakao et al. |
| 7,458,185 | B2 * | 12/2008 | Imaizumi et al. ............... 49/377 |
| 7,762,021 | B2 * | 7/2010 | Fujiwara et al. ................ 49/502 |
| 7,785,686 | B2 | 8/2010 | Fukui et al. |
| 8,001,727 | B2 | 8/2011 | Ho et al. |
| 2008/0095957 | A1 * | 4/2008 | Fukui et al. ...................... 428/33 |
| 2009/0064594 | A1 * | 3/2009 | Kimoto et al. ................ 49/489.1 |
| 2009/0121378 | A1 | 5/2009 | Ellis |
| 2009/0134661 | A1 | 5/2009 | Sugiura et al. |
| 2009/0183435 | A1 | 7/2009 | Daio et al. |
| 2010/0313487 | A1 | 12/2010 | Ellis et al. |
| 2012/0207979 | A1 * | 8/2012 | Mutoh et al. .................. 428/156 |

FOREIGN PATENT DOCUMENTS

| | | | |
|---|---|---|---|
| CN | 200985002 | Y | 12/2007 |
| CN | 200998992 | Y | 1/2008 |
| CN | 201009830 | Y | 1/2008 |
| CN | 101554764 | A | 10/2009 |
| CN | 101062669 | B | 8/2010 |
| CN | 201559597 | U | 8/2010 |
| CN | 201721407 | U | 1/2011 |
| EP | 401090 | A1 * | 12/1990 |
| EP | 1652410 | A3 * | 11/2007 |
| EP | 1652710 | B1 | 8/2009 |
| GB | 1168979 | A | 10/1969 |
| JP | 56135044 | A | 10/1981 |
| JP | 57155134 | A | 9/1982 |
| JP | 59227534 | A | 12/1984 |
| JP | 60048332 | A | 3/1985 |
| JP | 61050826 | A | 3/1986 |
| JP | 61077543 | A | 4/1986 |
| JP | 62194956 | A | 8/1987 |
| JP | 62240536 | A | 10/1987 |
| JP | 4035931 | A | 2/1992 |
| JP | 5278529 | A | 10/1993 |
| JP | 8002345 | A | 1/1996 |
| JP | 8020247 | A | 1/1996 |
| JP | 8034236 | A | 2/1996 |
| JP | 8034237 | A | 2/1996 |
| JP | 9099787 | A | 4/1997 |
| JP | 10044776 | A | 2/1998 |
| JP | 11227544 | A | 8/1999 |
| JP | 11314529 | A | 11/1999 |
| JP | 2000177498 | A | 6/2000 |
| JP | 2000203261 | A | 7/2000 |
| JP | 2002254993 | A | 9/2002 |
| JP | 2002274279 | A | 9/2002 |
| JP | 2005035472 | A | 2/2005 |
| JP | 2005254914 | A | 9/2005 |
| JP | 2010000817 | A | 1/2010 |
| JP | 2010036742 | A | 2/2010 |
| JP | 2010195064 | A | 9/2010 |
| JP | 2011131854 | A | 7/2011 |
| JP | 2011207333 | A | 10/2011 |
| KR | 100133764 | B1 | 12/1997 |
| KR | 2003033303 | A | 5/2003 |
| KR | 706421 | B1 | 4/2007 |
| KR | 2008032711 | A | 4/2008 |
| KR | 2008053044 | A | 6/2008 |

OTHER PUBLICATIONS

English language abstract and machine-assisted English translation of CN200985002 extracted from epacenet.com database on Aug. 24, 2014. 15 pages English language abstract and machine-assisted English translation of EP1652710 extracted from espacenet.com database on Aug. 24, 2014. 23 pages.

English language abstract and machine-assisted English translation for KR2003033303 extracted from the Thomson Innovation database on Aug. 25, 2014, 5 pages.

English language abstract and machine-assisted English translation for CN101062669 extracted from the Thomson Innovation database on Aug. 25, 2014, 11 pages.

English language abstract and machine-assisted English translation for JP11314529 extracted from the PAJ database on Aug. 25, 2014, 15 pages.

English language abstract and machine-assisted English translation for JP10044776 extracted from the PAJ database on Aug. 25, 2014, 12 pages.

English language abstract and machine-assisted English translation for JP9099787 extracted from the PAJ database on Aug. 25, 2014, 12 pages.

English language abstract and machine-assisted English translation for KR2008053044 extracted from the Thomson Innovation database on Aug. 25, 2014, 7 pages.

English language abstract and machine-assisted English translation for JP8034237 extracted from the PAJ database on Aug. 25, 2014, 10 pages.

English language abstract and machine-assisted English translation for JP8034236 extracted from the PAJ database on Aug. 25, 2014, 12 pages.

English language abstract and machine-assisted English translation for JP8020247 extracted from the Thomson Innovation database on Aug. 25, 2014, 4 pages.

English language abstract and machine-assisted English translation for JP8002345 extracted from the Thomson Innovation database on Aug. 25, 2014, 6 pages.

English language abstract and machine-assisted English translation of CN1465494 extracted from espacenet.com database on Aug. 24, 2014. 15 pages.

English language abstract and machine-assisted English translation for JP62240536 extracted from the Thomson Innovation database on Aug. 22, 2014, 4 pages.

English language abstract and machine-assisted English translation for JP62194956 extracted from the Thomson Innovation database on Aug. 22, 2014, 6 pages.

English language abstract and machine-assisted English translation for JP61077543 extracted from the Thomson Innovation database on Aug. 22, 2014, 4 pages.

English language abstract and machine-assisted English translation for JP60048332A extracted from the Thomson Innovation database on Aug. 25, 2014, 5 pages.

English language abstract and machine-assisted English translation for JP61050826A extracted from the Thomson Innovation database on Aug. 25, 2014, 5 pages.

English language abstract and machine-assisted English translation for JP56135044 extracted from the Thomson Innovation database on Aug. 25, 2014, 4 pages.

English language abstract and machine-assisted English translation for JP5278529 extracted from the PAJ database on Aug. 25, 2014, 13 pages.

English language abstract and machine-assisted English translation for JP4035931 extracted from the PAJ database on Aug. 25, 2014, 5 pages.

English language abstract and machine-assisted English translation for JP2011207333A extracted from the PAJ database on Aug. 25, 2014, 14 pages.

(56) References Cited

OTHER PUBLICATIONS

English language abstract and machine-assisted English translation of JP2011131854 extracted from espacenet.com database on Aug. 24, 2014. 18 pages.
English language abstract and machine-assisted English translation of JP2010195064 extracted from espacenet.com database on Aug. 24, 2014. 17 pages.
English language abstract and machine-assisted English translation of JP2010036742 extracted from espacenet.com database on Aug. 24, 2014. 30 pages.
English language abstract and machine-assisted English translation JP2010000817 extracted from espacenet.com database on Aug. 24, 2014. 17 pages.
English language abstract and machine-assisted English translation of JP2005254914 extracted from espacenet.com database on Aug. 24, 2014. 12 pages.
English language abstract and machine-assisted English translation of JP2005035472 extracted from espacenet.com database on Aug. 24, 2014. 20 pages.
English language abstract and machine-assisted English translation of JP2000203261 extracted from espacenet.com database on Aug. 24, 2014. 10 pages.
English language abstract and machine-assisted English translation of JP2002274279 extracted from espacenet.com database on Aug. 24, 2014. 18 pages.
English language patent of GB1168979.
English language abstract and machine-assisted English translation for CN201721407 extracted from the Thomson Innovation database on Aug. 25, 2014, 8 pages.
English language abstract and machine-assisted English translation for CN201559597 extracted from the Thomson Innovation database on Aug. 25, 2014, 7 pages.
English language abstract and machine-assisted English translation of CN201009830 extracted from espacenet.com database on Aug. 24, 2014. 13 pages.
English language abstract and machine-assisted English translation of CN200998992 extracted from espacenet.com database on Aug. 24, 2014. 11 pages.
English language abstract and machine-assisted English translation of CN101554764 extracted from espacenet.com database on Aug. 24, 2014. 64 pages.
English language abstract and machine-assisted English translation of CN200985001 extracted frin espacenet.com database on Aug. 24, 2014. 12 pages.
English language abstract and machine-assisted English translation for KR20080327111 extracted from the Thomson Innovation database on Aug. 25, 2014, 8 pages.
English language abstract and machine-assisted English translation of JP59227534 extracted from www.ipdl.inpit.go.jp database on Jan. 20, 2015. 5 pages.
English language abstract and machine-assisted English translation of JP57155134 extracted from www.ipdl.inpit.go.jp database on Jan. 20, 2015. 4 pages.
English language abstract and machine-assisted English translation of JP2002254993 extracted from www.ipdl.inpit.go.jp database on Jan. 20, 2015. 6 pages.
English language abstract and machine-assisted English translation of JP2000177498 extracted from espacenet.com database on Aug. 24, 2014. 14 pages.
English language abstract and machine-assisted English translation of JP11227544 extracted from www.lexisnexis.com/totalpatent database on Jan. 20, 2015. 6 pages.
English language abstract and machine-assisted English translation of KR100133764 extracted from www.lexisnexis.com/totalpatent database on Jan. 20, 2015. 4 pages.

* cited by examiner

DUAL END CAP FOR A SEAL ASSEMBLY

CROSS-REFERENCE TO RELATED APPLICATION

The subject patent application claims priority to and all the benefits of U.S. Provisional Patent Application No. 61/678,438 filed on Aug. 1, 2012, which is herein incorporated by reference in its entirety.

BACKGROUND OF THE INVENTION

1. Field of the Invention

The invention generally relates to a dual end cap for a seal assembly. More specifically, the invention relates to a dual end cap for a seal assembly where the dual end cap couples to a first seal and a second seal while creating an aesthetic transition between the first and second seal on a vehicle.

2. Description of Related Art

End caps are commonly used in conjunction with a seal on a vehicle. Generally, end caps are configured to close one side of a seal end. Some end caps however, provide a pleasing transition between two adjacent ends of the same seal or two adjacent ends of differing seals. While such end caps may successfully provide this pleasing transition, the end caps are only coupled to one of the two adjacent seal ends, and thus, the end caps merely abut the uncoupled seal end. As a result of the end caps not being coupled to both adjacent ends, these end caps can vibrate or rub against the vehicle.

Accordingly, there remains an opportunity to design an end cap that provides an aesthetic transition between two seal ends and that reduces the end caps propensity to vibrate while the vehicle is in motion.

SUMMARY OF THE INVENTION AND ADVANTAGES

The present invention provides a seal assembly for a vehicle. The seal assembly has a first seal for sealing a window of the vehicle. The first seal has a first distal end and a second distal end spaced along a path from the first distal end. The first seal defines a channel extending from the first distal end along the path toward the second distal end.

The seal assembly also has a second seal for sealing a window of the vehicle. The second seal has a third distal end, with the third distal end spaced from the first distal end of the first seal.

The seal assembly also has a dual end cap disposed between the first seal and the second seal. The dual end cap has a body disposed between the first distal end of the first seal and the third distal end of the second seal. The body has a first side facing the first distal end of the first seal, and a second side opposite the first side facing the third distal end of the second seal. The first side and the second side terminate at an edge. The dual end cap also has a cover attached to a portion of the edge. The cover extends beyond the first side and the first distal end of the first seal and extends beyond the second side and the third distal end of the second seal. The cover provides an aesthetic transition between the first seal and the second seal. The dual end cap also has a first projection extending traverse from the first side and disposed in the channel of the first seal for coupling the dual end cap to the first seal. The dual end cap also has a hold down feature extending traverse from the second side opposite the first projection. The hold down feature engages at least a portion of the third distal end of the second seal such that the portion of the third distal end is sandwiched between the cover and the hold down feature for securing the dual end cap to the second seal.

The present invention further provides the dual end cap for covering the first distal end of the first seal to the third distal end of the second seal. The first seal defines the channel extending from the first distal end. The dual end cap has the body having the first side and the second side opposite the first side with the first and second sides terminating at the edge. The dual end cap also has the cover attached to the portion of the edge. The cover extends beyond the first and second sides for providing the aesthetic transition between the first distal end of the first seal and the third distal end of the second seal. The dual end cap also has the first projection extending traverse from the first side for extending into the channel of the first seal to couple the dual end cap to the first seal. The dual end cap also has the hold down feature extending traverse from the second side and opposite the first projection. The hold down feature has an engagement end with the dual end cap defining a gap between the cover and the engagement end for receiving at least the portion of the third distal end of the second seal to couple the dual end cap to the second seal.

Advantageously, the dual end cap is coupled not only to the first seal, but the dual end cap is also coupled to the second seal. As a result of this dual coupling, the dual end cap is less prone to vibrational impact the vehicle while the vehicle is in motion. As such, the dual end cap provides an aesthetic transition between two adjacent seal ends without subjecting the exterior of the vehicle to wear or damage.

BRIEF DESCRIPTION OF THE DRAWINGS

Advantages of the present invention will be readily appreciated, as the same becomes better understood by reference to the following detailed description, when considered in connection with the accompanying drawings.

DETAILED DESCRIPTION OF THE INVENTION

Referring to the Figures, wherein like numerals indicates like or corresponding parts throughout the several views, a dual end cap 10 for a seal assembly 12 of a vehicle is generally shown. As best shown in FIGS. 1, 2, 8, 9, and 10, the seal assembly 12, includes a first seal 14 for sealing a first window of the vehicle, a second seal 16 for sealing a second window on the vehicle, and the dual end cap 10 for providing an aesthetic transition between the first seal 14 and the second seal 16.

The first seal 14 is typically produced through an extrusion process and subsequently mounted to the first window. The first window is typically movable. In other words, the first seal 14 is typically an extruded seal that is mounted to the movable window on the vehicle. The first seal 14 typically includes one or more flexible sealing elements or lips which wipingly and sealingly engage the movable window. Although not required, the first seal 14 typically has an arcuately configured exterior surface that faces away from the movable window.

Figure 1:
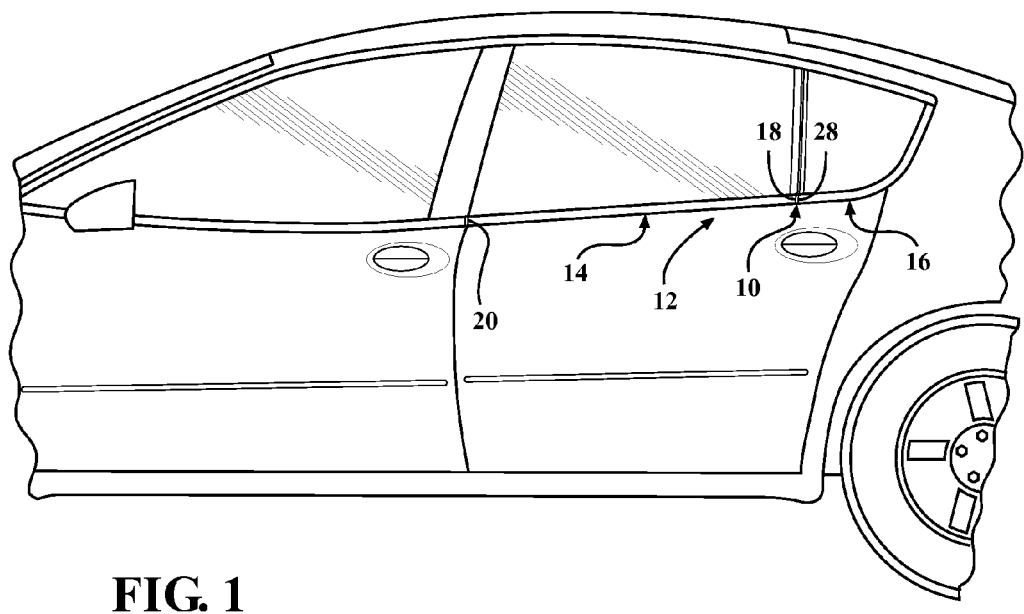
FIG. 1 is a fragmented side view of a vehicle having a seal assembly.
Figure 9:
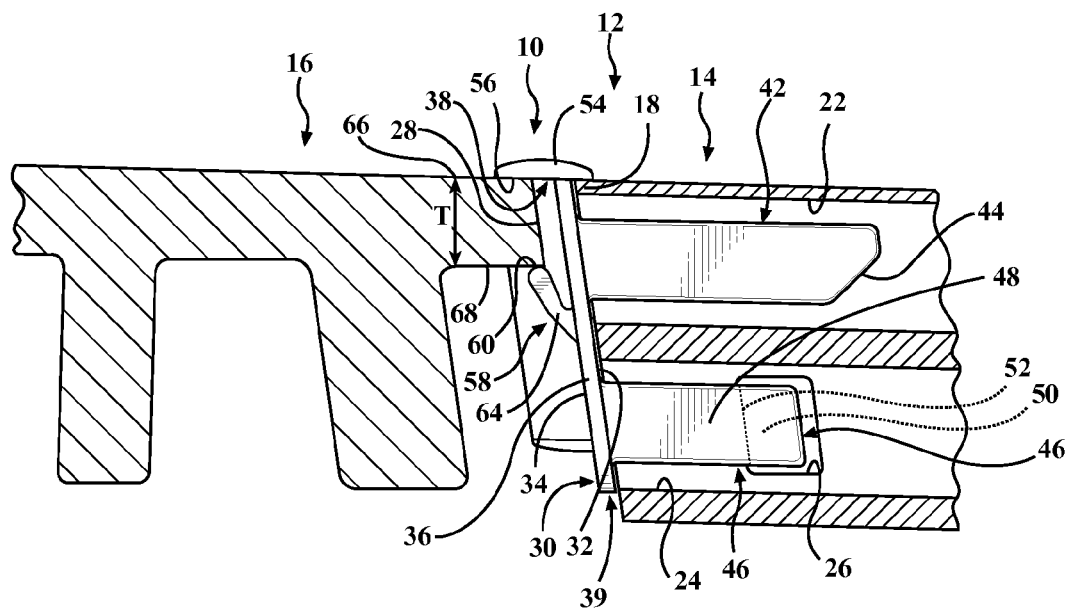
FIG. 9 is a fragmented partially cross-sectional side view of the dual end cap coupled to both seals.
Figure 10:
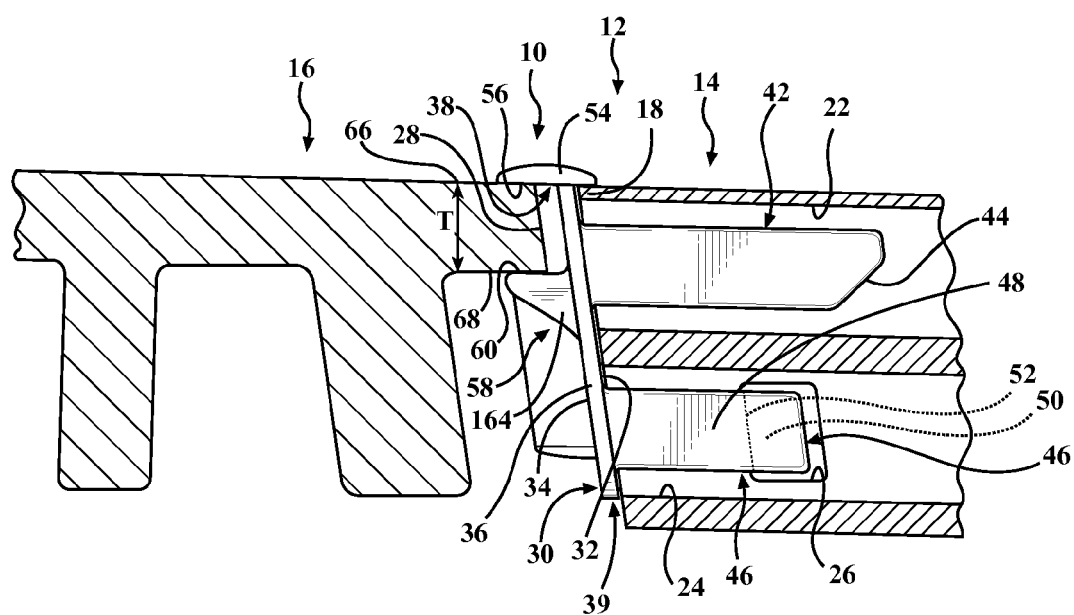
FIG. 10 is a fragmented partially cross-sectional side view of the alternative dual end cap coupled to both seals.

As shown in FIG. 1, the first seal 14 has a first distal end 18 and a second distal end 20 spaced from the first distal end 18 along a path. As best shown in FIGS. 9 and 10, the first seal 14 defines a channel 22 extending from the first distal end 18 along the path toward the second distal end 20 (not shown in FIG. 9) for coupling the first seal 14 to the dual end cap 10. In other words, the channel 22 is exposed and accessible through the first distal end 18 for receiving the dual end cap 20. More specifically, the channel 22 of the first seal 14 is further defined as the first channel 22. The first channel 22 may be an open or closed channel. Although not required, the first channel 22 may extend along the entire path from the first distal end 18 to the second distal end 20.

Although not required, as shown in FIGS. 9 and 10, the first seal 14 may also define a second channel 24 extending from the first distal 18 end along the path toward the second distal end 20. It is to be appreciated that the first seal 14 shown in FIGS. 9 and 10 is cross-sectioned through two different planes such that the first and second channels 22, 24 are both visible in FIGS. 9 and 10. Like the first channel 22, the second channel 24 may also be an open or closed channel. In a preferred embodiment, the second channel 24 is open. When the first seal defines the first and second channels 22, 24, the first and second channels 22, 24 receive the dual end cap 10 for coupling the dual end cap 10 to the first seal 14. In other words, the first and second channels 22, 24 are exposed and accessible through the first distal end 18. Although also not required, the second channel 24 may extend along the entire path from the first distal end 18 to the second distal end 20. In certain embodiments, the first seal 14 may also define a third channel 26 extending through the second channel 24. In general, the second channel 24 and the third channel 26 are perpendicular.

Figure 8:
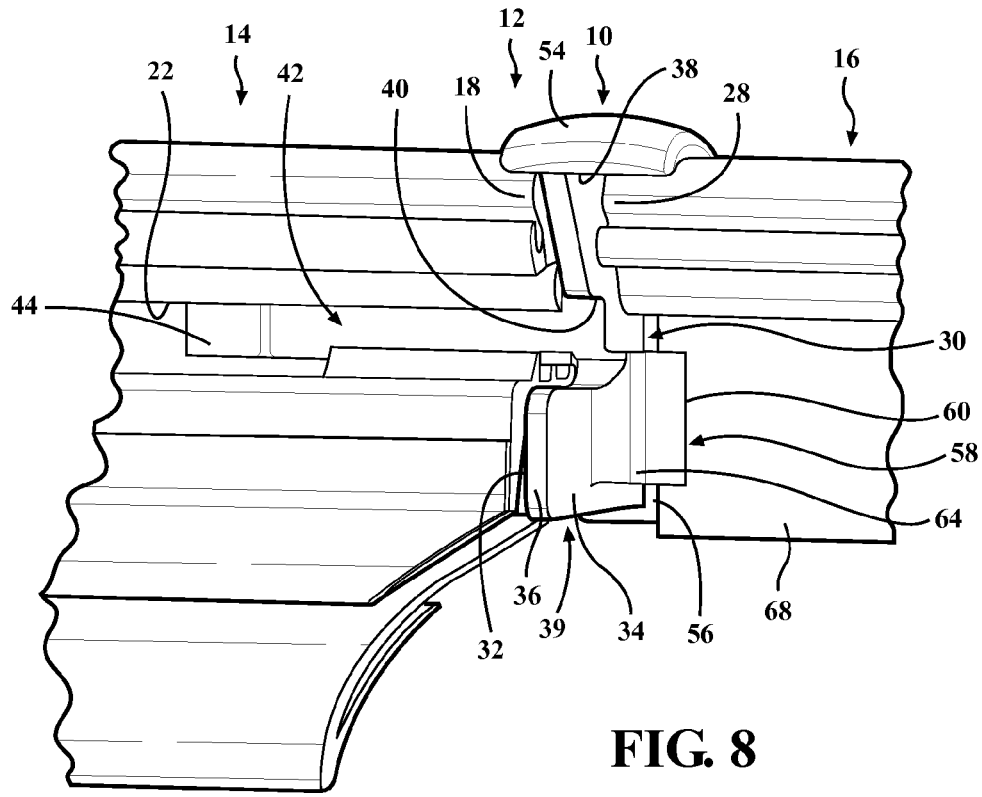
FIG. 8 is a fragmented perspective view of the dual end cap coupled to both a first seal and a second seal.

Referring back to FIG. 1, the second seal 16 is typically molded around the periphery of the second window. The second seal 16 may also be attached to the second window with an adhesive. In relation to the vehicle, the second window is typically not movable. As best shown in FIG. 8, the second seal 16 is spaced from the first seal 14. Specifically, the second seal 16 has a third distal end 28 with the third distal end 28 spaced from the first distal end 18 of the first seal 14. Although also not required, the second seal 16 typically has an arcuately configured exterior surface that faces away from the second window. It is desirable for the exterior surface of the second seal 16 to resemble the configuration of the exterior surface of the first seal 14.

Figure 2:
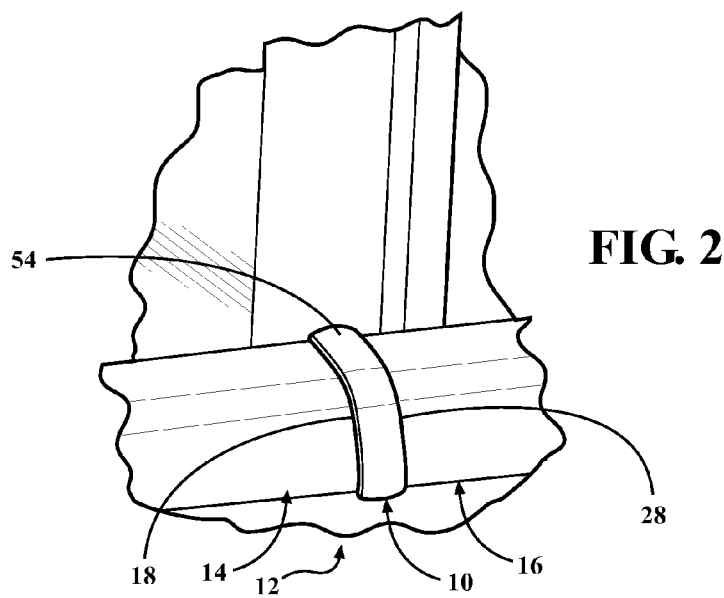
FIG. 2 is a fragmented perspective view of a portion of the seal assembly.

Referring to FIGS. 2, 9, and 10, the dual end cap 10 is disposed between the first and second seals 14, 16 for providing an aesthetic transition between the first and second seals 14, 16. In the seal assembly 12, the dual end cap 10 covers the first distal end 18 of the first seal 14 and the third distal end 28 of the second seal 16. Although not required, the dual end cap 10 is generally located in front of a vehicle pillar or division bar, as shown in FIGS. 1 and 2.

Figure 6:
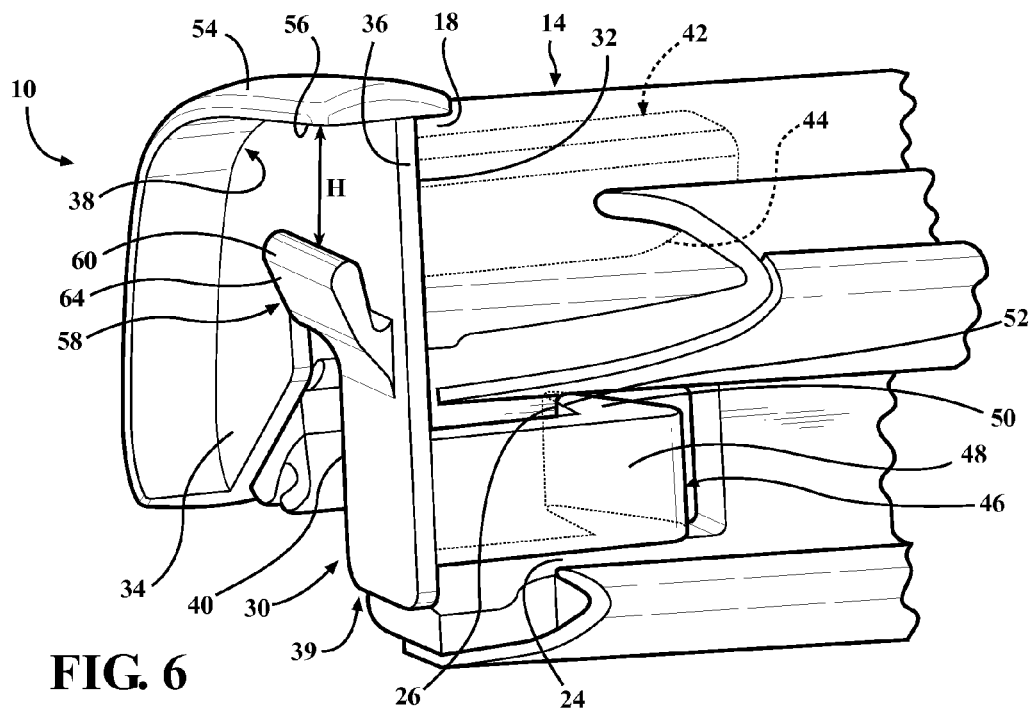
FIG. 6 is a fragmented perspective view of the dual end cap installed on a seal.
Figure 7:
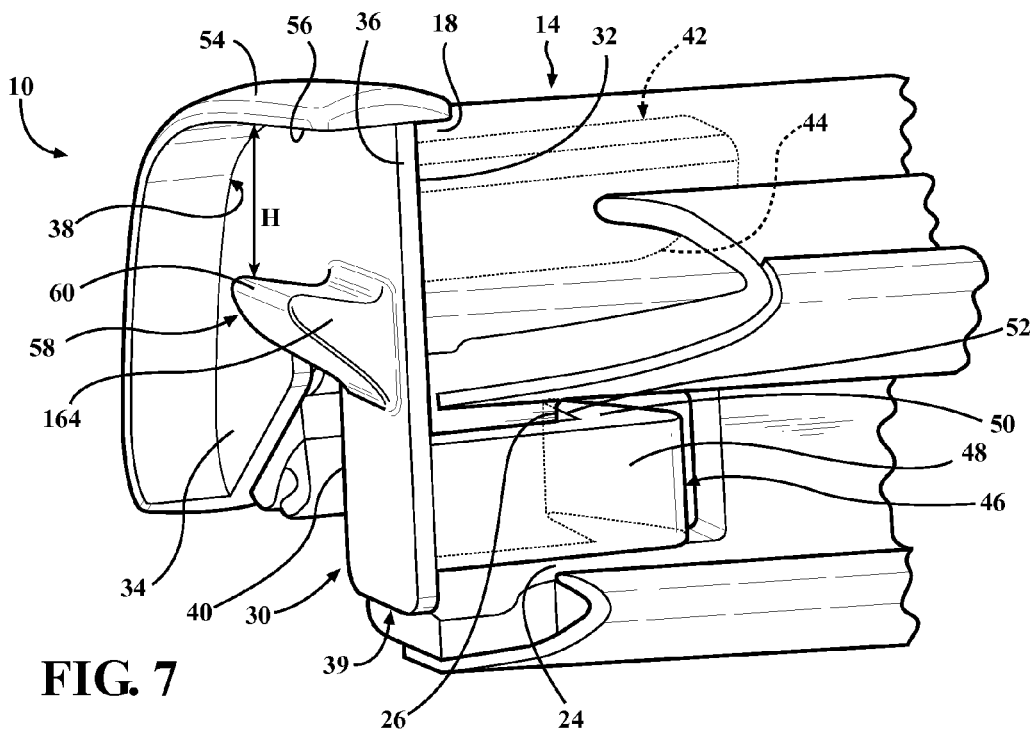
FIG. 7 is a fragmented perspective view of an alternative dual end cap installed on a seal.

As best shown in FIGS. 9 and 10, the dual end cap 10 has a body 30 disposed between the first distal end 18 of the first seal 14 and the third distal end 28 of the second seal 16. Referring now to FIG. 8, the body 30 has a first side 32 facing the first distal end 18 of the first seal 14, and a second side 34 opposite the first side 32 facing the third distal end 28 of the second seal 16. The first and second sides 32, 34 terminate at an edge 36. Without departing from the broadest scope of the present invention, the body 30 and thus the edge 36, are shaped similar or complimentary to the exterior surfaces of the first and second seals 14, 16. In other words, the dual end cap 10 is not limited to any specific configuration of the first or second seal 16. However, because the dual end cap 10 provides an aesthetic transition between the first and second seals 14, 16, the edge 36 of the dual end cap 10 generally shares or resembles the configuration of the exterior surfaces of the first and second seals 14, 16. Most often, as shown in FIGS. 6 and 7, the edge 36 will have an upper section 38 having the arcuate configuration and a lower section 39 having a generally linear configuration, such that arcuate section resembles the exterior surfaces of the first and/or second seal 14, 16.

Figure 4:
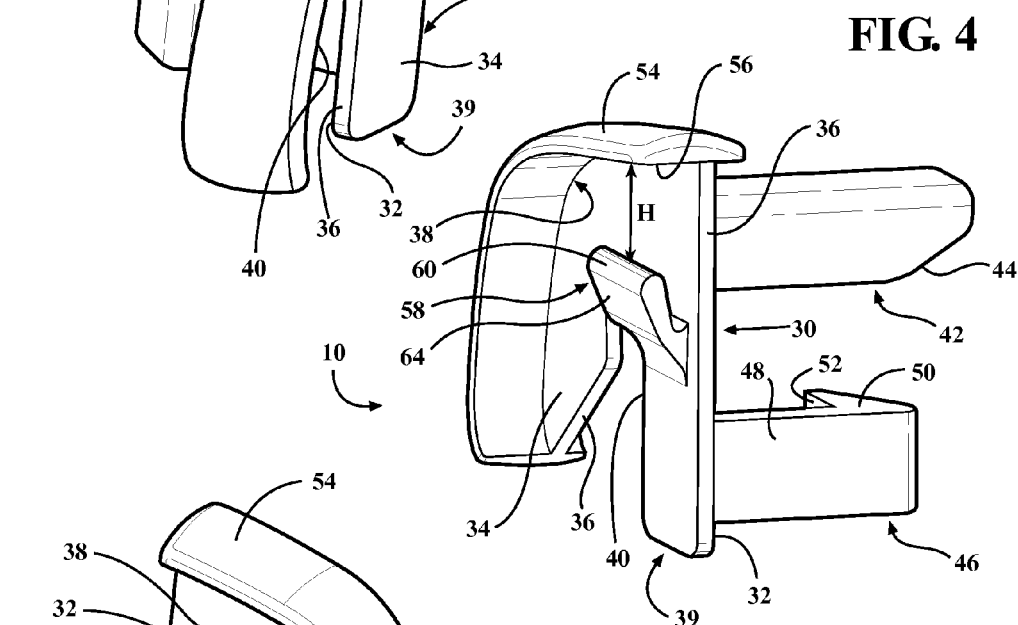
FIG. 4 is another perspective view of the dual end cap.
Figure 5:
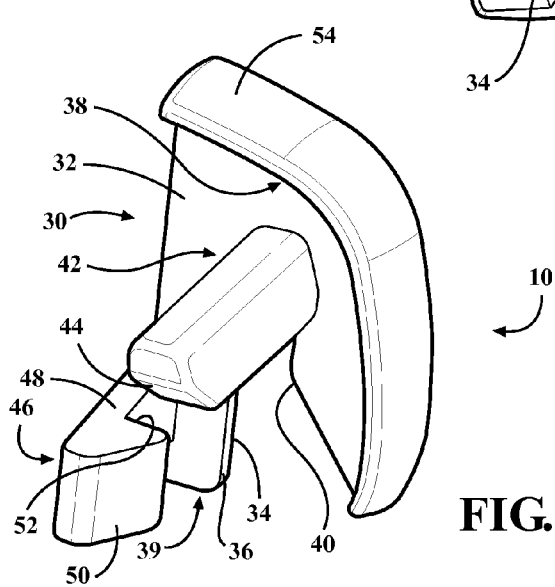
FIG. 5 is yet another perspective view of the dual end cap.

As best shown in FIGS. 4 and 5, the body 30 also defines a recess 40 for allowing the dual end cap 10 to be positioned about a portion of the vehicle. For example, the recess 40 may allow the dual end cap 10 to be positioned about an upstanding flange on a vehicle door.

Figure 3:
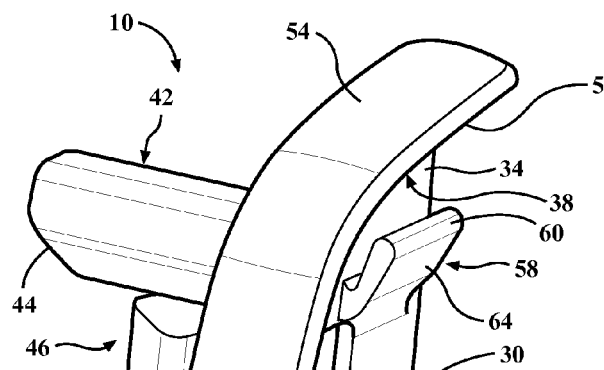
FIG. 3 is a perspective view of a dual end cap.

Referring to FIGS. 3-5, the dual end cap 10 also has a first projection 42 extending traverse from the first side 32 for extending into the first channel 22 of the first seal 14 to couple the dual end cap 10 to the first seal 14. As such, as shown in FIGS. 8, 9, and 10 the first projection 42 of the dual end cap 10 is disposed in the first channel 22. In a preferred embodiment, the first projection 42 is inserted into the first channel 22. It is to be appreciated, that although the first projection 42 couples the dual end cap 10 to the first seal 14, this coupling does not require the dual end cap 10 to be mechanically interlocked with the first seal 14. For example, when the dual end cap 10 is coupled to the first seal 14 and not yet adjacent the second seal 16, it may be possible to separate the dual end cap 10 from the first seal 14 by pulling the dual end cap 10 in a direction opposite the first projection 42.

As best shown in FIG. 8, the first projection 42 is complimentarily shaped to the first channel 22 of the first seal 14 for allowing the first projection 42 to be inserted in the first channel 22. Referring back to FIGS. 3-5, the first projection 42 defines a plurality of smooth edges which are rounded, for facilitating the alignment and insertion of the first projection 42 into the first channel 22 of the first seal 14. The first projection 42 also defines an angled surface 44 for positioning the first projection 42 into the first channel 22 of the first seal 14. Like the first projection 42, the angled surface 44 also defines a plurality of smooth edges which are rounded to further facilitate the insertion of the first projection 42 into the first channel 22 of the first seal 14.

Although not required, the dual end cap 10 may also have a second projection 46 extending traverse from the first side 32, as shown in FIGS. 4-7, for extending into the second channel 24 of the first seal 14 to further couple the dual end cap 10 to the first seal 14. As such, as shown in FIGS. 6, 7, 9, and 10, the second projection 46 of the dual end cap 10 is disposed in the second channel 24. In the most preferred embodiment, the second projection 46 is generally parallel to the first projection 42.

As best shown in FIGS. 5-7, the second projection 46 has a flange 48 that is resiliently deformable, and a barb 50 extending traverse from the flange 48. The barb 50 has a triangular configuration such that the flange 48 and the barb 50 collectively have a hook shape configuration. The barb 50 also defines a stopping surface 52 traverse to the flange 48 for abutting the third channel 26 of the first seal 14.

When the second projection 46 is initially inserted into the second channel 24 of the first seal 14, the barb 50 contacts a portion of the first seal 14 defining the second channel 24. The contact exerts a force on the barb 50 such that the flange 48 flexes as the second projection 46 is inserted into the second channel 24. As shown in FIGS. 6 and 7, during insertion, the barb 50 reaches and enters the third channel 26, thereby eliminating the force acting on the barb 50, thereby returning flange 48 to return to a non-flexed position. Once the barb 50 is disposed in the third channel 26, the stopping surface 52 is oriented parallel to a portion of the first seal 14 that defines the third channel 26. The parallel orientation precludes the second projection 46 from being removed or pulled out of the second channel 24, thereby further coupling the dual end cap 10 to the first seal 14. In other words, the orientation results in the direct abutment of two parallel surfaces, and thus the orientation prevents the removal of the second projection 46 from the first seal 14. As such, the second projection 46 mechanically interlocks the dual end cap 10 and the first seal 14. While a specific embodiment of the second projection 46 is described above, it is to be appreciated that the second projection 46 can be any desired shape or configuration for further coupling the dual end cap 10 to the first seal 14.

As generally shown in the Figures, the dual end cap 10 also has a cover 54 mounted to a portion of the edge 36. The cover 54 extends beyond the first and second sides 32, 34 for providing an aesthetic transition between the first and second seals 14, 16. Specifically, as best shown in FIGS. 8 and 9, the cover 54 extends beyond the first side 32 and the first distal end 18 of the first seal 14, and extends beyond the second side 34 and the third distal end 28 of the second seal 16 for providing an aesthetic transition between the first distal end 18 and the third distal end 28. As such, despite that the fact that the first distal end 18 of the first seal 14 is spaced from the third distal end 28 of the second seal 16, a space or void is not visible because the cover 54 of the dual end cap 10 hides the space from view. Of course, the body 30 of the dual end cap 10 also occupies the space, but the cover 54 is the only portion of the dual end cap 10 that is visible to an observer. The cover 54 also has an under surface 56 that faces the second seal 16 in the seal assembly 12.

Because the exact configuration of the edge 36 will vary depending on the exterior surfaces of the first and second seals 14, 16, the exact shape of the cover 54 will also vary. Generally, the cover 54 is arcuate and mounted to the arcuately configured upper section 38 of the edge 36. The cover 54 also has a general rectangular configuration with tapered sides and may contain both linear and arcuate segments.

Referring to FIGS. 3, 4, 6, and 7, the dual end cap 10 also has a hold down feature 58 extending traverse from the second side 34 and opposite the first projection 42 for securing the dual end cap 10 to the second seal 16. Specifically, the hold down feature 58 extends from the second side 34 of the body 30 between the upper and lower sections 38, 39 of the edge 36 in the general direction of the under surface 56 of the cover 54.

The hold down feature 58 also has an engagement end 60 facing the under surface 56 of the cover. The dual end cap 10 defines a gap between the engagement end 60 and the undersurface 56 of the cover 54. The gap has a height H. At least a portion of the third distal end 28 of the second seal 16 is received in the gap for securing the dual end cap 10 to the second seal 16. In other words, the portion of the third distal end 28 is sandwiched between the under surface 56 of the cover 54 and the engagement end 60. In still other words, the portion of the third distal end 28 is clamped between the cover 54 and the engagement end 60. It is of course, to be appreciated that the entire third distal end 28 may also be received in the gap. As such, the exact amount of the third distal end 28 received in the gap will vary based on the configuration of the second seal 16. It is of course also to be appreciated that other portions of the hold down feature 58 may also secure the third distal end 28 between the hold down feature 58 and the cover 54. The engagement end 60 also has a width that is parallel to a portion of the under surface 56 of the cover 54. Orienting the width of the engagement end 60 to be parallel with a portion of the under surface 56 provides an effective level of engagement with the third distal end 28. In other words, the parallel orientation ensures that the third distal end 28 has an adequate level of contact with both the engagement end 60 and the under surface 56.

Referring to FIGS. 9 and 10, the third distal end 28 of the second seal 16 has an exterior surface 66 facing the under surface 56 of the cover 54 in the seal assembly 12. The third distal end 28 also has an interior surface 68 opposite the exterior surface 66 and facing the engagement end 60. The portion of the third distal end 28 also has a thickness T defined between the exterior surface 66 and the interior surface 68.

Without departing from the broadest scope of the invention, the hold down feature 58 may have any configuration for securing the dual end cap 10 to the second seal 16. In one embodiment, as best shown in FIGS. 6 and 9, the hold down feature 58 may have an arm 64 extending from the second side 34 of the body 30 to the engagement end 60. The arm 64 of the hold down feature 58 is resiliently deformable for receiving the third distal end 28 of the second seal 16. In this embodiment, the engagement end 60 of the hold down feature 58 has a bulbous configuration relative to the arm 64.

In this embodiment with the hold down feature 58 having the arm 64, when the portion of the third distal end 28 is sandwiched, the exterior surface 66 directly abuts the under surface 56 of the cover 54 and the interior surface 68 directly abuts the engagement end 60 and/or the arm 64 of the hold down feature 58. As the dual end cap 10 receives the portion of the third distal end 28 and is secured to the second seal 16, the portion of the third distal end 28 contacts the engagement end 60 of the hold down feature 58 such that the arm 64 flexes toward the second side 34 to allow the dual end cap 10 to receive the third distal end 28. The bulbous configuration of the engagement end 60 enables the engagement end 60 to deflect contact between the engagement end 60 and the third distal end 28 for further facilitating the reception of the third distal end 28. In other words, the bulbous configuration enables the engagement end 60 to glide past the third distal end 28.

In another embodiment, as shown in FIGS. 7 and 10, the hold down feature 58 has a body 164 that is wedge shaped (hereinafter the wedge shaped body 164), such that the hold down feature 58 is substantially wedge shaped. The wedge shaped body 164 extends from the second side 34 of the body 30 to the engagement end 60. The wedge shaped body 164 of the hold down feature 58 is resiliently deformable for receiving the third distal end 28 of the second seal 16. In this embodiment, due to the wedge shaped body 164, the engagement end 60 of the hold down feature 58 is substantially planar.

In this embodiment with the hold down feature 58 having the wedged shaped body 164, as shown in FIG. 10, as the dual end cap 10 receives the portion of the third distal end 28 and is secured to the second seal 16, the portion of the third distal end 28 contacts the engagement end 60 of the hold down feature 58 such that the wedge shaped body 164 flexes toward the second side 34 to allow the dual end cap 10 to receive the third distal end 28. The substantially planar configuration of the engagement end 60 provides a large degree of contact between the hold down feature 58 and the portion of the third distal end 28. In this embodiment when the portion of the third distal end 28 is sandwiched, the exterior surface 66 directly abuts the under surface 56 of the cover 54 and the interior surface 68 directly abuts the engagement end 60. Typically, the interior surface 68 directly abuts both the engagement end 60 and a portion of the wedge shaped body 164. Even more typically, the interior surface 68 directly abuts both the engagement end 60 and a substantial portion of the wedge shaped body 164. In other words, because of the wedge shaped body 164 and the substantially planar configuration of the engagement end 60, the interior surface 68 abuts both the engagement end and the wedge shaped body 164.

In both embodiments, (i.e., the embodiment with the hold down feature 58 having the arm 64 and the embodiment with the hold down feature 58 having the wedge shaped body 164) as shown in FIGS. 9 and 10 respectively, after the second seal 16 is received in the gap, the hold down feature 58 is in a non-flexed or partially flexed position. The hold down feature 58 is in the non-flexed position when no force is acting on the hold down feature 58. The hold down feature 58 is in a partially flexed position when the height H of the gap between the engagement end 60 and the under surface 56 is less than the thickness T between the exterior surface 66 and the interior surface 68 of the portion of the third distal end 28.

The dual end cap 10 is generally rigid and comprises a polymeric material. As such, the dual end cap 10 is generally hard. The rigidity may be accomplished by producing the dual end cap 10 from a rigid polymeric material such as polyamide 6 or polyamide 66. The rigidity may also be accomplished by adding reinforcing fillers, such as glass, to the polymeric material. Of course, the rigidity may also be accomplished by using both the rigid polymeric material and reinforcing filler. For example the dual end cap 10 may comprise polyamide 6 and glass filler for establishing the rigidity of the dual end cap 10.

The dual end cap 10 of the seal assembly 12 is coupled to the first seal 14 by the first and second projections 42, 46 and is coupled to the second seal 16 through the cooperation of the cover 54 and hold down feature 58. As result of this dual coupling, the dual end cap 10 does not adversely vibrate or rub against a painted portion of the vehicle when the vehicle is in motion. As such, the dual does not produce the above described undesirable consequences because the dual end cap 10 is coupled (i.e., secured) to both the first and second seals 14, 16.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A seal assembly for a vehicle comprising:
  a first seal for sealing a window of the vehicle, with said first seal having a first distal end and a second distal end spaced along a path from said first distal end and said first seal defining a channel extending from said first distal end along said path toward said second distal end;
  a second seal for sealing a window of the vehicle, with said second seal having a third distal end with said third distal end spaced from said first distal end of said first seal; and
  a dual end cap disposed between said first seal and said second seal, said dual end cap having,
    a body disposed between said first distal end of said first seal and said third distal end of said second seal with said body having a width extending along a plane with a first side extending along the plane facing said first distal end of said first seal and a second side extending along the plane opposite said first side entirely facing said third distal end of said second seal with said first and second sides terminating at an edge,
    a cover attached to a portion of said edge and extending beyond said plane and said first side and said first distal end of said first seal, and extending beyond said plane and said second side and said third distal end of said second seal for providing an aesthetic transition between said first seal and said second seal,
    a first projection extending traverse from said plane and said first side, and disposed in said channel of said first seal for coupling said dual end cap to said first seal, and
    a hold down feature extending traverse from said plane and said second side opposite said first projection of said first side with said hold down feature engaging at least a portion of said third distal end of said second seal such that said portion of said third distal end directly abuts both said cover extending beyond said second side and said hold down feature such that said portion of said third distal end is sandwiched between said cover and said hold down feature for securing said dual end cap to said second seal.

2. The seal assembly as set forth in claim 1 wherein said cover has an under surface facing said second seal and wherein said hold down feature has an engagement end facing said under surface to define a gap with said portion of said third distal end of said second seal being disposed within said gap between said under surface and said engagement end.

3. The seal assembly as set forth in claim 2 wherein said third distal end of said second seal has an exterior surface and an interior surface opposite said exterior surface with said exterior surface directly abutting said under surface of said cover and said interior surface directly abutting said engagement end of said hold down feature.

4. The seal assembly as set forth in claim 2 wherein said engagement end of said hold down feature has a width.

5. The seal assembly as set forth in claim 4 wherein said width of said engagement end is parallel to a portion of said under surface of said cover.

6. The seal assembly as set forth in claim 2 wherein said hold down feature has an arm extending from said second side of said body to said engagement end with said engagement end having a bulbous configuration relative to a configuration of said arm.

7. The seal assembly as set forth in claim 6 wherein said arm of said hold down feature extends toward said under surface of said cover.

8. The seal assembly as set forth in claim 6 wherein said arm of said hold down feature is resiliently deformable.

9. The seal assembly as set forth in claim 2 wherein said engagement end of said hold down feature is substantially planar.

10. The seal assembly as set forth in claim 9 wherein said hold down feature is substantially wedged shaped.

11. The seal assembly as set forth in claim 1 wherein said edge of said body has an upper section having an arcuate configuration and a lower section with said cover mounted to said arcuately configured upper section.

12. The seal assembly as set forth in claim 11 wherein said hold down feature extends from said second side of said body between said upper and lower sections.

13. The seal assembly as set forth in claim 1 wherein said channel is further defined as a first channel and said first seal further defines a second channel extending from said first distal end along said path toward said second distal end, and said dual end cap has a second projection extending traverse from said first side and disposed in said second channel for further coupling said dual end cap to said first seal.

14. The seal assembly as set forth in claim 13 wherein said first and second projections are parallel to each other.

15. The seal assembly as set forth in claim 1 wherein said first seal is produced through an extrusion process and mounted to a window that is movable on the vehicle, and wherein the second seal is molded around the periphery of a second window that is stationary on the vehicle.

16. The seal assembly as set forth in claim 1 wherein said hold down feature is resiliently deformable.

17. The seal assembly as set forth in claim 4 wherein said width of said engagement end of said hold down feature is smaller than said width of said body along said plane.

\* \* \* \* \*